United States Patent Office 3,254,083
Patented May 31, 1966

3,254,083
[1-(MONOCARBOCYCLIC ARYL)-CYCLOALKYL]-
[(TERTIARYAMINO)-LOWER ALKYL] ETHERS
Kurt Stach, Mannheim, Harald Arthur Friesewinkel,
Mannheim-Feudenheim, Hans-Guenther Kroneberg,
Wuppertal-Elberfeld, Kurt Stoepel, Mannheim-Kaefertal,
and Werner Winter, Mannheim, Germany, assignors
to C. F. Boehringer & Soehne G.m.b.H., Mannheim-Waldhof,
Germany, a company of Germany
No Drawing. Filed Jan. 4, 1961, Ser. No. 88,590
Claims priority, application Germany, May 2, 1959,
B 53,114; Mar. 12, 1960, B 57,041
13 Claims. (Cl. 260—247.7)

The present invention relates to new basic 1-aryl and 1-arylalkyl cycloalkanol ethers.

This application is a continuation-in-part of our co-pending application Serial No. 25,544 for "New Basic Cycloalkanol Ethers, and Process of Making Same," filed on April 29, 1960.

According to said afore-cited application basic 1-phenyl cycloalkanol ethers which are substituted in the phenyl group have desirable pharmacological properties. It has now been found that the 1-benzyl cycloalkanol ethers are also pharmacologically effective.

Basic 1-phenyl cyclohexanol ethers which do not contain substituents in their phenyl radical have been known for some time. For instance, compounds of the following Formula I have been described:

(I)
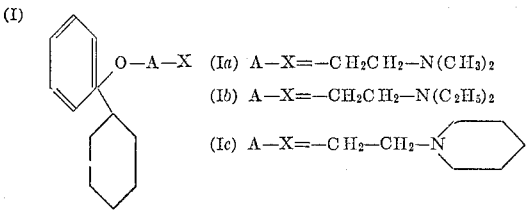

$(Ia)$ $A-X=-CH_2CH_2-N(CH_3)_2$
$(Ib)$ $A-X=-CH_2CH_2-N(C_2H_5)_2$
$(Ic)$ $A-X=-CH_2-CH_2-N\!\!<$

In said Formula I the substituent —A—X indicates the dimethylamino ethyl group, the diethylamino ethyl group, and the N-piperidino ethyl group. Said known 1-phenyl cyclohexanol ethers do not possess any noteworthy physiological properties. They exert only an antihistaminic action which, however, is so slight that they cannot be used therapeutically.

It is one object of the present invention to provide new basic cycloalkanol ethers of highly valuable properties which compounds have proved to be pharmacologically effective.

Another object of the present invention is to provide new and highly effective therapeutic compositions and useful therapeutic agents in neurology.

A further object of the present invention is to provide a simple and effective process of making such compounds.

These and other objects of the present invention and advantageous features thereof will become apparent as the description proceeds.

The new basic cycloalkanol ethers according to the present invention correspond to the Formula II (II)
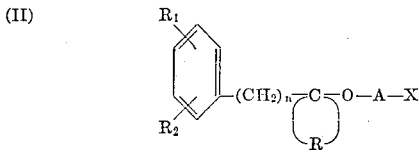

In said formula
$n$ is either one or zero,
R is an alkylene radical $—(CH_2)_n—$ with 4 to 7 carbon atoms,
$R_1$ and $R_2$ are halogen, lower alkyl radicals, alkoxy groups, or alkyl mercapto groups, and one of said substituents $R_1$ and $R_2$ may also be hydrogen when $n$ is zero, and both may be hydrogen when $n$ is one;
A is a straight chain or branched alkylene radical, and
X is a basic group, preferably a tertiary amino group.

The acid addition salts and the quaternary ammonium compounds of the aforedescribed compounds are also included.

It has been found that said new compounds which have either a phenyl radical substituted by the above mentioned substituents $R_1$ and $R_2$, at least one of which is not hydrogen, or a benzyl radical, possess highly valuable physiological properties which render them useful in pharmacotherapy. Compared with the above mentioned known compounds, the new basic ethers according to the present invention have a considerably increased anti-Parkinson activity while, at the same time, their cholinergic-mydriatic activity is decreased. The new compounds according to the present invention have a relatively low toxicity, a significant anti-nicotinic activity, a weak antihistaminic activity, and only slight effects on the circulation.

Furthermore, it has been found that those compounds according to the present invention which have cycloalkyl radicals other than cyclohexyl radicals in their molecule have also interesting physiological properties. These new compounds subdue the brain stem motoricity and inhibit the tremorin effect on the central nervous system in a manner similar to that of known anti-Parkinson drugs, whereas they exhibit only a slight peripheral anticholinergic effect.

The basic ethers according to the present invention may carry a secondary or tertiary amino group as basic substituent of the alkyl ether group, for instance, monoalkylamino groups, dialkylamino groups, or heterocyclic groups, such as substituted or unsubstituted piperidino, pyrrolidino, morpholino, and piperazino groups.

The new compounds according to the present invention are prepared according to methods known for the preparation of basic ethers. The preferred method of preparation consists in reacting a substituted 1-phenyl or 1-benzyl cycloalkanol of the Formula III (III)
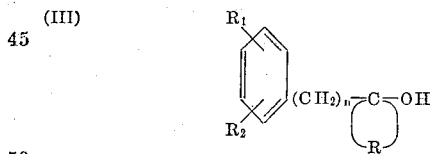

with alkyl halides being substituted by a basic group and corresponding to the following Formula IV (IV)     Hal—A—X wherein
Hal is halogen while
A and X represent groups and substituents as indicated hereinabove.

The acid addition salts of such alkyl halogenides may also be used as reactants.

It is also possible to employ the corresponding halogeno alkanols of the Formula V (V)     Hal—A—OH or alkyl dihalides of the Formula VI (VI)     Hal—A—Hal as reactants in place of the amino alkyl halides of Formula IV and to introduce the basic group X into the molecule of the resulting condensation product according to methods known per se.

The basic ethers of cycloalkanols according to the present invention are prepared in principle by following the procedures given hereinafter.

*Method I*

A solution of 0.1 mole of a cycloalkanol of Formula III in about 80 cc. of anhydrous toluene or benzene is added drop by drop to a suspension of 4.0 g. (0.1 mole) of sodium amide in 20 cc. of toluene or benzene at room temperature while stirring vigorously. Thereafter, the reaction mixture is heated to 50–60° C., until evolution of ammonia has ceased. In order to complete the reaction, the mixture may be heated under reflux, if required.

0.11–0.12 mole of an amino alkyl halide, dissolved in the same amount, by volume, of toluene or benzene are added drop by drop to the reaction mixture at room temperature while stirring. The reaction mixture is then heated to the boiling point of the respective solvent for several hours. After cooling, the precipitate is filtered off, the filtrate is evaporated in a vacuum, and the residue is distilled in a high vacuum.

*Method II*

A solution of 0.1 mole of a cycloalkanol of Formula III in about 100 cc. of anhydrous toluene is added drop by drop to a suspension of sodium amide (0.2–0.3 mole) in 50 cc. of anhydrous toluene. The reaction mixture is then heated to about 50–60° C. for one hour and is heated to boiling under reflux, if required. 0.1 mole of the hydrochloride of an amino alkyl halide is added to the reaction mixture at about 50° C., and the mixture is heated to boiling for 3 hours. After cooling, any excess of sodium amide is decomposed by carefully adding drop by drop a mixture of alcohol and water (1:1) thereto. The toluene layer is shaken with about 30 cc. of water, dried, and evaporated to dryness in a vacuum. The oily residue is distilled in a high vacuum.

The above described methods I and II yield essentially the same results. However, when starting with compounds in which R represents $(CH_2)_4$, i.e., the cyclopentyl group, Method II is the preferred method. The basic ethers obtained by any of said methods can be converted into their acid addition salts and preferably into their hydrochlorides or into their quaternary ammonium compounds according to known methods.

In the following table compounds are listed which have been prepared according to the above mentioned methods. These compounds are given only as examples without, of course, limiting the scope of the present invention thereto.

TABLE

| Example No. | Compound | Boiling point (° C./mm. Hg) | Melting point of the hydrochloride (° C.) | Yield (percent base) |
|---|---|---|---|---|
| 1 | [1-(p-chloro phenyl) cyclohexyl]-[β-dimethylamino ethyl] ether. | 140–146/0.4 | 177–179 | 65–70 |
| 2 | [1-(p-chloro phenyl) cyclohexyl]-[β-diethylamino ethyl] ether. | 145–152/0.8 | [1] 145–146 | 70–75 |
| 3 | [1-(p-chloro phenyl) cyclohexyl]-[β-dimethylamino propyl] ether. | 135–141/0.1 | 182–183 | 60–65 |
| 4 | [1-(p-chloro phenyl) cyclohexyl]-[β-(1-piperidino) ethyl] ether. | 165–175/0.5 | 181–182 | 65–70 |
| 5 | [1-(p-chloro phenyl) cyclohexyl]-[β-(4-morpholino) ethyl ether. | 185–190/0.3 | 178–179 | 55–60 |
| 6 | [1-(o-chloro phenyl) cyclohexyl]-[β-dimethylamino ethyl] ether. | 138–143/0.3 | 146–147 | 65–70 |
| 7 | [1-(o-tolyl) cyclohexyl]-[β-dimethylamino ethyl] ether. | 125–135/0.5 | 172–173 | 50–55 |
| 8 | [1-(o-anisyl) cyclohexyl]-[β-dimethylamino ethyl] ether. | 130–140/0.3 | 131–133 | 70–75 |
| 9 | [1-(p-chloro phenyl) cyclohexyl]-[β-(1-pyrrolidino) ethyl] ether. | 145–155/0.2 | 178–179 | 65–70 |
| 10 | [1-(p-chloro phenyl) cyclohexyl]-[β-(4-methyl piperazinyl-1)-ethyl] ether. | 194–196/0.8 | [2] 215–216 | 50 |
| 11 | [1-(p-chloro phenyl) cyclohexyl]-[γ-(4-methyl piperazinyl-1)-propyl] ether. | 175–185/0.05 | [3] 238 | 55 |
| 12 | [1-(o-chloro phenyl) cyclohexyl]-[β-diethylamino ethyl] ether. | 140–150/0.5 | 117–119 | 55–60 |
| 13 | [1-(o-chloro phenyl) cyclohexyl]-[β-(1-piperidino) ethyl] ether. | 166–178/0.05 | 152–154 | 50 |
| 14 | [1-(o-chloro phenyl) cyclohexyl]-[γ-dimethylamino propyl] ether. | 135–138/0.3 | 145–146 | 60–65 |
| 15 | [1-(p-chloro phenyl) cyclohexyl]-[γ-diethylamino propyl] ether. | 178–187/0.6 | 178 | 50–55 |
| 16 | [1-(p-chloro phenyl) cyclohexyl]-[γ-(1-piperidino) propyl] ether. | 175–185/0.2 | 221–222 | 60–65 |
| 17 | [1-(p-tolyl) cyclohexyl]-[β-diethylamino ethyl] ether. | 125–130/0.5 | 151 | 50–55 |
| 18 | [1-(o-tolyl) cyclohexyl]-[β-(1-piperidino) ethyl] ether. | 160–173/0.2 | 173–174 | 55–60 |
| 19 | [1-(o-anisyl) cyclohexyl]-[β-(1-piperidino) ethyl] ether. | 165–168/0.2 | 138 | 55–60 |
| 20 | [1-(p-methyl mercapto phenyl) cyclohexyl]-[β-diethylamino ethyl] ether. | 160–170/0.4 | 116 | 60 |
| 21 | [1-(p-chloro phenyl) cyclopentyl]-[β-diethylamino ethyl] ether. | 140–145/0.4 | 138 | 50–55 |
| 22 | [1-(p-chloro phenyl) cyclopentyl]-[β-(1-piperidino) ethyl] ether. | 168–180/0.2 | 176 | 65–70 |
| 23 | [1-(p-chloro phenyl) cyclopentyl]-[γ-(4-methyl-piperazinyl-1)-propyl] ether. | 190–199/0.3 | (dec.) 244 | 40–45 |
| 24 | [1-(p-tolyl) cyclopentyl]-[β-diethylamino ethyl] ether. | 125–135/0.1 | 133 | 60–70 |
| 25 | [1-(p-tolyl) cyclopentyl]-[β-(1-piperidino) ethyl] ether. | 165–175/0.4 | 144 | 60–65 |
| 26 | [1-(p-chloro phenyl) cycloheptyl]-[β-diethylamino ethyl] ether. | 160–180/0.4 | 129 | 50 |
| 27 | [1-(p-chloro phenyl) cyclooctyl]-[β-diethylamino ethyl] ether. | 180–190/0.8 | 132 | 70 |
| 28 | 1-(benzyl cyclohexyl)-(β-dimethylamino ethyl) ether. | 120–133/0.2 | 134–135 | 60–65 |
| 29 | 1-(benzyl cyclohexyl)-(β-dimethylamino ethyl) ether. | 130–136/0.25 | 118–120 | 50–55 |
| 30 | 1-(benzyl cyclohexyl)-[β-(1-piperidino)-ethyl] ether. | 154–160/0.1 | 180–181 | 85–90 |
| 31 | [1-(p-chloro benzyl) cyclohexyl]-[β-diethylamino ethyl] ether. | 155–160/0.1 | 148–149 | 45–50 |
| 32 | [1-(p-chloro benzyl) cyclohexyl]-[β-(1-piperidino) ethyl] ether. | 150–160/0.5 | 179–181 | 45–50 |

See footnotes at end of table.

TABLE—Continued

| Example No. | Compound | Boiling point (° C./mm. Hg) | Melting point of the hydrochloride (° C.) | Yield (percent base) |
|---|---|---|---|---|
| 33 | [1-(o-chloro benzyl) cyclohexyl]-[β-diethyl-amino ethyl] ether. | 140–145/0.5 | 138–139 | 45–50 |
| 34 | 1-(benzyl cyclopentyl)-(β-diethylamino ethyl) ether. | 131–141/0.3 | 79–80 | 50–55 |
| 35 | [1-(p-chloro benzyl) cyclopentyl]-[β-diethyl-amino ethyl] ether. | 160–175/0.6 | 122 | 50–55 |
| 36 | [1-(p-chloro benzyl) cyclohexyl]-[γ-(4-methyl piperazinyl-1)-propyl] ether. | 192–196/0.5 | 235–238 | 50 |
| 37 | [1-(p-chloro benzyl) cyclohexyl]-[β-(4-methyl piperazinyl-1)-ethyl] ether. | 192–197/0.1 | 198–199 | 45–50 |
| 38 | [1-(p-chloro benzyl) cyclohexyl]-[γ-(1-piperidino) propyl] ether. | 187–193/0.2 | 148–150 | 65–70 |
| 39 | 1-(benzyl cycloheptyl)-(β-diethylamino ethyl) ether. | 170–178/0.6 | 118–119 | 40–45 |
| 40 | [1-(p-chloro benzyl) cycloheptyl]-[β-diethyl-amino ethyl] ether. | 158–161/0.4 | 125–127 | 60–65 |
| 41 | 1-(benzyl cyclooctyl)-(β-diethylamino ethyl) ether. | 161–171/0.2 | 134–135 | 55–60 |
| 42 | [1-(p-chloro benzyl) cyclooctyl]-[β-diethyl-amino ethyl] ether. | 175–182/0.2 | 167–168 | 50–55 |
| 43 | [1-(p-chloro benzyl) cyclooctyl]-[β-(1-piperidino) ethyl] ether. | 180–200/0.4 | 190 | 65–70 |

[1] M.P. of the ethobromide, 215°.
[2] 1 mol. of $H_2O$.
[3] ½ mol. of $H_2O$.

The following starting materials for making the basic 1-aryl cycloalkyl ethers according to the present invention are new:

1-(p-chloro phenyl) cyclohexanol—M.P. 76–77° C.
1-(o-chloro phenyl) cyclohexanol—M.P. 56–57° C.
1-(p-methyl mercapto phenyl) cyclohexanol—M.P. 65–67° C.
1-(p-chloro phenyl) cyclopentanol—M.P. 60° C.
1-(o-anisyl) cyclopentanol—M.P. 43–44° C.
1-(p-chloro phenyl) cycloheptanol—B.P. 157–163° C./0.4 mm.
1-(p-chloro phenyl) cyclooctanol—M.P. 41° C.
1-(p-chloro benzyl) cyclohexanol—M.P. 63–64° C.
1-(o-chloro benzyl) cyclohexanol—B.P. 125–135° C./0.1 mm.
1-(p-methyl benzyl) cyclohexanol—B.P. 123–125° C./1 mm.
1-(p-chloro benzyl) cycloheptanol—M.P. 69–71° C.
1-benzyl-cyclooctanol—B.P. 138–142° C./0.2 mm.; M.P. 35° C.
1-(p-chloro benzyl) cyclooctanol—M.P. 53–54° C.

They can be obtained in a manner similar to that by which the following known 1-aryl cycloalkanols are produced.

1-(p-tolyl) cyclohexanol: "Compt. rend.," vol. 138, p. 1322 (1904);
1-(o-tolyl) cyclohexanol: "Soc.," 1932, p. 1833; "Am Chem. Soc.," vol. 75, p. 3970 (1953);
1-(p-anisyl) cyclohexanol: "Rec. trav. chim.," vol. 67, p. 489 (1948); "Soc.," 1932, p. 1834;
1-(o-anisyl) cyclohexanol: "Soc." 1951, p. 516;
1-(p-tolyl) cyclopentanol: Vila a. Crespo, Chem. Abstr. 1953, p. 3802g.
1-benzyl cyclohexanol: "Ber. dtsch. chem. Ges.," vol. 48, p. 1218 (1915);
1-benzyl cyclopentanol: "J. Am. Chem. Soc.," vol. 78, pages 124–133 (1956);
1-benzyl cycloheptanol: "Comt. rend. acad. sci. U.S.S.R." 1941, pages 728–731; "Chem. Abstr.," vol. 37, column 616 (1943).

These compounds are obtained by Grignard reaction of the respective cycloalkanones with the corresponding aryl and benzyl halides. For this purpose a solution of the aryl or benzyl halide in absolute ether is added to magnesium turnings whereby the corresponding aryl or benzyl magnesium halide is formed. The cycloalkanone is then added to the Grignard reagent to form the corresponding aryl or benzyl cycloalkanol. The reaction mixture is worked up in the usual manner to isolate the resulting aryl or benzyl cycloalkanol.

As stated hereinabove, the new compounds have proved to be of considerable value in the treatment of Parkinsonism and similar diseases. In contrast to known anti-Parkinson drugs, such as 2-diethylamino ethyl-1-phenyl cyclopentane carboxylic hydrochloride sold under the trademark "Panparnit" which differs in structural respect essentially from the claimed compound by being a basic carboxylic acid ester compound, the new basic ethers according to the present invention possess a considerably lower peripheral anti-cholinergic effect. In addition thereto, a number of such new compounds is much more effective than said known anti-Parkinson drug when tested according to the characteristic antitremorin test. Compounds with such a higher activity are, for instance, [1-(p-chloro phenyl) cyclohexyl]-[γ-(1-piperidino) propyl] ether and the corresponding [β-(1-piperidino) ethyl] ether, [1-(p-chloro benzyl cyclohexyl]-[β-diethylamino ethyl] ether, [1-(p-chloro benzyl cyclohexyl]-[β-(1-piperidino) ethyl] ether, and [1-(p-chloro benzyl) cyclohexyl]-[γ-(1-piperidino) propyl] ether.

Most of the compounds according to the present invention cause pronounced stimulation of the central nervous system. This stimulating effect is observed, for instance, in the following compound [1-(p-chloro phenyl) cyclohexyl]-[β-diethylamino ethyl] ether and the corresponding [γ-diethylamino propyl] ether. Such stimulating effects are not encountered when administering the known anti-Parkinson drugs such as "Panparnit" and "Disipal." Due to the absence of peripheral anticholinergic properties, the side-effects which are observed on administration of the known anti-Parkinson drugs, are not produced by administration of the compounds according to the present invention. Some members of the new basic ethers, for instance [1-(p-chloro phenyl) cyclohexyl]-[γ-methyl piperazinyl-1) propyl] ether and the corresponding cyclopentyl ether, are distinguished by their strong central nervous system stimulating activity without exhibiting the antitremorin activity characteristics for anti-Parkinson drugs.

When used on humans, the new agents are preferably administered orally in solid form such as in the form of tablets, pills, dragees, lozenges, and the like shaped preparations, or in powder form, preferably enclosed in gelatin and the like capsules. Administration in liquid form, such as in the form of emulsions, suspensions, sirups, and the like is also possible. These solid and liquid preparations are produced in a manner known to the art of compounding and processing pharmaceutical products, whereby the conventional diluting agents, binding agent, lubricants, expanding agents, and the like may be employed.

The new compounds are preferably administered in the form of their acid addition salts such as the hydrochlorides, sulfates, phosphates, nitrates, or the like. Salts with organic acids may also be used such as the salts with acetic acid, citric acid, succinic acid, and others. These salts are prepared in a manner known per se, for instance, by dissolving the base in a suitable organic solvent and adding the calculated amount of the respective acid thereto or by neutralizing the base in aqueous suspension with the required amount of the respective acid, for instance, hydrochloric acid, and concentrating by evaporation the resulting aqueous solution until the salt crystallizes.

The quaternary ammonium compounds of the new basic ethers are also prepared in a manner known per se, for instance, by reacting the base with a quaternizing agent such as an alkyl halogenide, dimethyl sulfate, and the like.

Of course, many changes and variations in the starting materials and reactants used, the condensing agents and solvents employed, the reaction conditions, temperature, and duration, the methods of working up the reaction mixture and of isolating and purifying the reaction products, and the like may be made by those skilled in the art in accordance with the principles set forth herein and in the claims annexed hereto.

We claim:
1. [1-(p-chloro phenyl) cyclohexyl]-[β - diethylamino ethyl] ether.
2. [1-(p-chloro phenyl) cyclohexyl]-[γ - diethylamino propyl] ether.
3. [1-(p-chloro phenyl) cyclohexyl]-[γ-(1-piperidino) propyl] ether.
4. [1-(p-chloro phenyl) cyclohexyl]-[β-(1-piperidino) ethyl] ether.
5. [1-(p-chloro phenyl) cyclohexyl]-[β - (4 - morpholino) ethyl] ether.
6. [1-(p-chloro phenyl) cyclohexyl] - [γ - (4 - methyl piperazinyl-1)-propyl] ether.
7. [1-(p-chloro phenyl) cyclopentyl] - [γ - (4 - methyl piperazinyl-1)-propyl] ether.
8. [1 - (p - chloro phenyl) cycloalkyl] - [dilower alkyl amino lower alkyl] ether, the cycloalkyl member in said ether having 5 to 8 carbon atoms.
9. [1-(p-chloro benzyl) cyclohexyl] - [β - diethylamino ethyl] ether.
10. [1-(p-chloro benzyl) cyclohexyl]-[β-1 - piperidino ethyl] ether.
11. [1-(p-chloro benzyl) cyclohexyl]-[γ-1 - piperidino propyl] ether.
12. [1-(p-chloro phenyl) cyclohexyl] - [β - dimethylamino ethyl] ether.
13. A cycloalkanol ether compound selected from the group consisting of bases of the formula

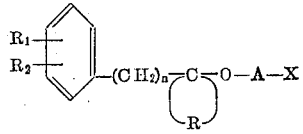

wherein
 $n$ represents an integer selected from the group consisting of zero and one;
 R represents alkylene 4–7 carbon atoms;
 $R_1$ represents a member selected from the group consisting of hydrogen, halogen, lower alkyl, lower alkoxy and lower alkyl mercapto; provided $R_1$ is hydrogen, only when $n$ is 1;
 $R_2$ represents a member selected from the group consisting of hydrogen, halogen, lower alkyl, lower alkoxy, and lower alkyl mercapto;
 A represents alkylene having 2 to 3 carbon atoms; and
 X represents a member selected from the group consisting of di-(lower)-alkyl amino, piperidyl, morpholyl, pyrrolidinyl, and 4-methyl piperazinyl, said X being linked by the nitrogen atom thereof to A,
the non-toxic, pharmaceutically acceptable acid addition salts thereof and the lower alkyl quaternary ammonium salts thereof.

References Cited by the Examiner
UNITED STATES PATENTS

| | | | |
|---|---|---|---|
| 2,748,116 | 5/1956 | Cusic et al. | 260—294.7 |
| 2,812,327 | 11/1957 | Ohnacker et al. | 260—294.7 |

FOREIGN PATENTS

| | | |
|---|---|---|
| 529,385 | 12/1954 | Belgium. |
| 1,094,738 | 12/1960 | Germany. |

NICHOLAS S. RIZZO, *Primary Examiner.*

IRVING MARCUS, WALTER A. MODANCE,
*Examiners.*